June 3, 1969     R. H. A. SCHOONOVER     3,447,621
TRIPLE WALKING BEAM SUSPENSION AND DRIVE ASSEMBLY
FOR TRACK LAYING VEHICLES
Filed Aug. 15, 1967

Richard H. A. Schoonover
INVENTOR
BY
Oliver D. Olson
Agent

United States Patent Office 3,447,621
Patented June 3, 1969

3,447,621
TRIPLE WALKING BEAM SUSPENSION AND DRIVE ASSEMBLY FOR TRACK LAYING VEHICLES
Richard H. A. Schoonover, Albany, Oreg., assignor to Katrak Vehicle Company, Albany, Oreg., a corporation of Oregon
Filed Aug. 15, 1967, Ser. No. 660,826
Int. Cl. B62d 55/12
U.S. Cl. 180—9.52          7 Claims

ABSTRACT OF THE DISCLOSURE

Front and rear walking beams are interconnected intermediate their ends pivotally to the front and rear ends of an intermediate main walking beam secured pivotally intermediate its ends to a vehicle frame. An hydraulic power cylinder on the frame engages the main walking beam to pivot the latter. A driven sprocket on the main walking beam engages an endless track mounted on wheels journaled on the opposite ends of the front and rear walking beams.

BACKGROUND OF THE INVENTION

This invention relates to track laying vehicles, and more particularly to a novel suspension and guide assembly therefor.

There have been provided heretofore various types of track laying vehicles including the type having high flotation characteristics for use in snow, swamps and other similarly unstable surfaces. However, such vehicles are characterized generally by massive, heavy and expensive construction, by a relatively rigid suspension which contributes adversely to a severe ride, and by a fixed and limited approach angle to obstacles, thereby limiting the utility of the vehicles.

SUMMARY OF THE INVENTION

In its basic concept the suspension and drive assembly of this invention utilizes a triple walking beam arrangement which provides a relatively long support for an endless track and thus minimizes ground pressure, and by which the forward portion of the endless track is adjustably angularly and resiliently with respect to horizontal, to provide a practicable degree of resilient suspension and varying degree of obstruction approach angle.

It is by virtue of the foregoing basic concept that the principal objective of the present invention is achieved, namely to overcome the disadvantages and limitations of prior track laying vehicles, as discussed hereinbefore.

Another important object of the present invention is the provision of a suspension and drive assembly for track laying vehicles, which assembly is of simplified and rugged construction for economical manufacture and long service life.

The foregoing and other objects and advantages of the present invention will appear from the following detailed description, taken in connection with the accompanying drawing of the preferred embodiment.

DESCRIPTION OF THE PREFERRED EMBODIMENT

Figure 1:
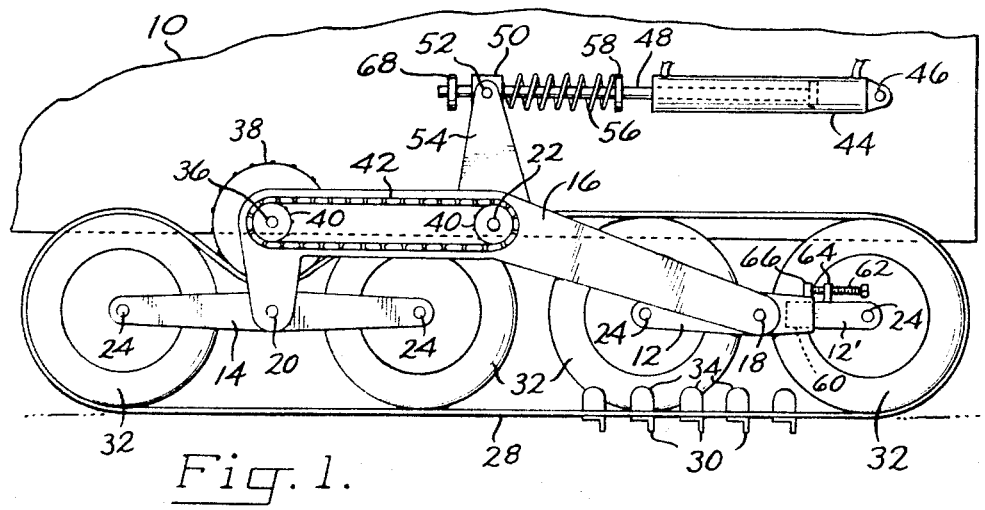
FIG. 1 is a fragmentary view in side elevation of a track laying vehicle showing a suspension and drive assembly embodying the features of the present invention, the components being shown in normal position providing maximum flotation characteristics.

The assembly of the present invention is provided at each side of a vehicle frame 10, one side only being illustrated in the drawing. The assembly includes front and rear walking beams 12 and 14, respectively, interconnected pivotally intermediate their ends by the intermediate main walking beam 16, by means of the pivot shafts 18 and 20, respectively. The main walking beam is secured intermediate its ends to the vehicle frame by means of the pivot shaft 22.

The opposite ends of the front and rear walking beams each carries a shaft 24 which supports a track-mounting wheel 26. Trained over the wheels is an endless track member 28 provided with longitudinally spaced, outwardly projecting ground engaging lugs 30.

In the preferred embodiment illustrated, the track-mounting wheels include pneumatic tires 32 which contribute to a softer ride. Accordingly there is provided on the interconnected links of the track member laterally spaced pairs of inwardly projecting guide plates 34 which serve to straddle and confine between them the outer peripheral portions of the pneumatic tires. These guide plates serve to maintain the track member properly aligned on the wheels.

Power means is provided for driving the endless track member. The rearward end portion of the main walking beam mounts a rotary shaft 36 to which is secured the driven sprocket 38. The sprocket is arranged in driving engagement with the endless track member between the wheels mounted on the rear walking beam 14. Although a source of rotary power may be connected directly to the sprocket, the preferred arrangement illustrated includes a pair of sprockets 40 secured one to each of the shafts 22 and 36 and interconnected by the drive chain 42. A source of rotary power (not shown) such as an internal combustion engine supported on the vehicle frame, is coupled to the drive shaft 22 which serves also as a pivot shaft for the main walking beam.

Power means also is provided for pivoting the main walking beam. In the embodiment illustrated the power means comprises an extensible hydraulic motor in the form of a piston-cylinder unit. One end of the cylinder 44 is mounted pivotally on the vehicle frame, as by means of the pivot pin 46. Projecting from the opposite end of the cylinder is an elongated piston rod 48 which reciprocates relative to the cylinder upon the application of hydraulic pressure selectively to opposite ends of the cylinder, as is well known. The piston rod extends slidably through an apertured abutment block 50 which is mounted pivotally, by means of the pin 52, on the tab 54 projecting laterally from the main walking beam intermediate the ends of the latter. A coil spring 56 freely encircles a portion of the piston rod between the abutment block and a collar 58 secured to the piston rod.

Means is provided for tensioning the track member on the mounting wheels. In the embodiment illustrated, the front end portion 12' of the front walking beam is separate from the main portion and has a rearwardly extending, non-circular shank 60. The shank is receivable telescopically in a corresponding non-circular opening in the adjacent end of the main portion of the beam. An elongated adjusting screw 62 is threaded through a lug 64 on the end portion 12' and is anchored rotatably in a lug 66 on the main portion. Thus, rotatable adjustment of the screw extends or retracts the end portion 12' relative to the main portion, to vary the tension of the track member.

It will be understood that the foregoing track tension means may be provided on the forward end portion of the main walking beam 16 or on the rearward end portion of the rear walking beam 14, rather than on the front walking beam, if so desired.

The operation of the assembly described hereinbefore is as follows: With the piston rod 48 retracted to the position illustrated in FIG. 1, the spring 56 exerts minimum pressure on the abutment block 50. The walking beams thus are disposed such that the ground engaging stretch of the track member 28 is on a flat plane. Minimum ground pressure, and therefore maximum flotation, is provided under these conditions.

Let it now be assumed that it is desired to adjust the assembly to an improved obstacle approach angle. Hydraulic fluid under pressure is delivered to the front end of the cylinder 44 to extend the piston rod 48 toward the left. This results in compression of the spring 56 and rotation of the main walking beam 16 resiliently counterclockwise to the position illustrated in FIG. 2. This results in elevation of the front walking beam 12 and consequent angular elevation of the forward portion of the endless track member. The vehicle frame 10 also is elevated slightly relative to the ground, thus providing increased ground clearance.

If the obstacle is quite high, the forward angular portion of the track is brought into abutment with the obstacle and then the cylinder 44 is fed with hydraulic fluid to retract the piston rod 48 until the second abutment collar 68 engages the block 50. Further retraction of the piston rod then rotates the main walking beam 16 clockwise, thus lifting the rear walking beam 14 and the intermediate portion of the track to a position at which the working portion of the track is disposed at a lesser angle, whereby the vehicle is better able to traverse the obstacle.

Counterclockwise rotation of the main walking beam also results in movement of the driven sprocket 38 downward between the wheels on the rear walking beam 14. In this manner the driven sprocket is maintained in maximum track-driving engagement, automatically tensioning the track member to compensate for its slightly greater length resulting from elevation of the front wheels.

Figure 2:
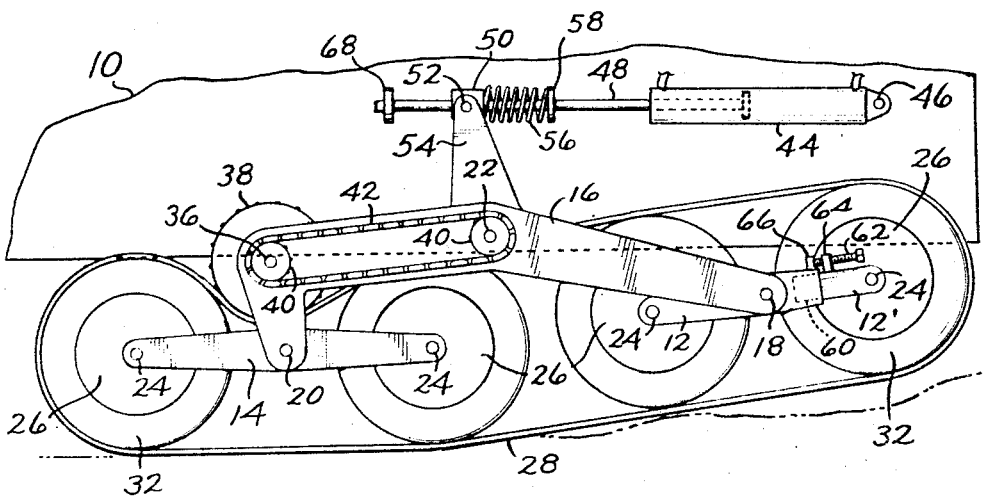
FIG. 2 is a fragmentary view in side elevation, similar to FIG. 1 but showing the components arranged to provide an improved obstacle approach angle.

From the foregoing it will be appreciated that the suspension and drive assembly of the present invention provides for track laying vehicles many advantages heretofore unavailable. High flotation characteristics, afforded by adjustment of the assembly to the condition illustrated in FIG. 1, renders the vehicle suitable for use in swamps, snow and other unstable ground conditions. The resilience of the coil spring 56 and the pneumatic tires 32 provides maximum smoothness of ride. The position of adjustment illustrated in FIG. 2 provides improved obstacle approach angle while maintaining maximum flotation, and also affords increased ground clearance.

It will be understood that the suspension and drive assembly described hereinbefore may be utilized in a single pair as the entire support for a vehicle, or as front and rear pairs either for a single vehicle or for a pair of vehicles connected together in tandem.

It will be apparent to those skilled in the art that various changes may be made in the size, number, type and arrangement of parts described hereinbefore, without departing from the spirit of this invention.

Having now described my invention and the manner in which it may be used, I claim:

1. A suspension and drive assembly for track laying vehicles comprising:
   (a) front and rear walking beams,
   (b) a main walking beam mounted intermediate its ends pivotally on the vehicle frame,
   (c) pivot means interconnecting the front and rear ends of the main walking beam and the front and rear walking beams, respectively, intermediate the ends of the latter,
   (d) power means on the vehicle frame engaging the main walking beam for pivoting the latter,
   (e) track-mounting wheels on the opposite ends of the front and rear walking beams,
   (f) an endless track member passing around the wheels at the outer ends of the front and rear walking beams and with the inner wheels positioned between and in alignment with the upper and lower runs of said track for guiding said track, and
   (g) a driven sprocket on the main walking beam engaging the outer surface of the track member.

2. The assembly of claim 1 wherein the driven sprocket is mounted on the rearward portion of the main walking beam and engages the track member between the wheels on the rear walking beam.

3. The assembly of claim 1 including
   (a) a drive shaft pivotally connecting the main walking beam to the vehicle frame, and
   (b) drive connecting means interengaging the drive shaft and driven sprocket.

4. The assembly of claim 1 wherein
   (a) the power means comprises an extensible hydraulic motor mounted pivotally at one end on the vehicle frame, and
   (b) resilient means interengages the main walking beam and the opposite end of the motor.

5. The assembly of claim 4 wherein the hydraulic motor comprises
   (a) a piston-cylinder unit having a piston rod projecting from one end of the cylinder,
   (b) the opposite end of the cylinder being mounted pivotally on the vehicle frame,
   (c) the piston rod extending through an abutment member mounted pivotally on the main walking beam, and
   (d) the resilient means comprises a coil spring encircling the piston rod between the abutment member and a collar on the piston rod.

6. The assembly of claim 5 including a second collar on the piston rod on the side of the abutment member opposite the first named collar.

7. The assembly of claim 1 wherein one of the walking beams is adjustable in length.

References Cited

UNITED STATES PATENTS

| | | | |
|---|---|---|---|
| 1,006,083 | 10/1911 | Haight | 305—23 X |
| 1,705,980 | 3/1929 | Knox | 305—20 X |
| 1,862,934 | 6/1932 | Knox | 305—27 X |
| 2,584,512 | 2/1952 | Strait | 305—20 |
| 2,645,437 | 7/1953 | Bonmartini | 305—23 X |
| 3,299,978 | 1/1967 | Sponsler | 180—9.52 |

RICHARD J. JOHNSON, *Primary Examiner.*

U.S. Cl. X.R.

180—9.56, 9.64; 305—20, 23